(12) United States Patent
Ely et al.

(10) Patent No.: US 11,924,055 B2
(45) Date of Patent: *Mar. 5, 2024

(54) ELECTRONIC DEVICE WITH INTUITIVE CONTROL INTERFACE

(71) Applicant: Apple Inc., Cupertino, CA (US)

(72) Inventors: Colin M. Ely, Sunnyvale, CA (US); Erik G. de Jong, San Francisco, CA (US); Stephen Brian Lynch, Portola Valley, CA (US); Fletcher R. Rothkopf, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 109 days.

This patent is subject to a terminal disclaimer.

(21) Appl. No.: 17/096,769

(22) Filed: Nov. 12, 2020

(65) Prior Publication Data

US 2021/0067418 A1 Mar. 4, 2021

Related U.S. Application Data

(63) Continuation of application No. 16/056,284, filed on Aug. 6, 2018, now Pat. No. 10,841,174.

(51) Int. Cl.
*H04L 41/22* (2022.01)
*G02B 27/01* (2006.01)
(Continued)

(52) U.S. Cl.
CPC .......... *H04L 41/22* (2013.01); *G02B 27/0172* (2013.01); *G06F 3/04817* (2013.01);
(Continued)

(58) Field of Classification Search
None
See application file for complete search history.

(56) References Cited

U.S. PATENT DOCUMENTS

| 2004/0032398 A1 | 2/2004 | Ariel et al. |
| 2011/0063224 A1 | 3/2011 | Vexo et al. |

(Continued)

OTHER PUBLICATIONS

Minato-ku, "Machine translated application publication: 2011-164666", 2011 (Year: 2011).

*Primary Examiner* — Tapas Mazumder
(74) *Attorney, Agent, or Firm* — Treyz Law Group, P.C.; Kendall P. Woodruff

(57) ABSTRACT

An electronic device may include a display system and control circuitry. The user's environment may be presented on the display system. The environment on the display system may be a captured image of the environment, may be the actual real world viewed through an optical combiner, or may be a completely virtual image representing the environment. The control circuitry may gather information about external electronic devices in the user's environment, including determining a type and location of each external electronic device and a status of wireless communications links between external electronic devices. The display system may overlay computer-generated display elements onto the user's environment to indicate the status of wireless communications links between the external electronic devices. In response to touch or gesture input, the control circuitry may send control signals to the external electronic devices to establish or break wireless communications links between external electronic devices.

12 Claims, 5 Drawing Sheets

(51) Int. Cl.
*G06F 3/04817* (2022.01)
*G06F 3/0488* (2022.01)
*G06T 19/00* (2011.01)
*H04W 16/20* (2009.01)
*H04W 76/14* (2018.01)

(52) U.S. Cl.
CPC .......... *G06F 3/0488* (2013.01); *G06T 19/006* (2013.01); *H04W 16/20* (2013.01); *H04W 76/14* (2018.02)

(56) References Cited

U.S. PATENT DOCUMENTS

| | | |
|---|---|---|
| 2014/0005809 A1 | 1/2014 | Frei et al. |
| 2014/0185142 A1 | 7/2014 | Gupta et al. |
| 2014/0245160 A1 | 8/2014 | Bauer et al. |
| 2016/0198499 A1* | 7/2016 | Lee ...................... H04W 4/026 455/450 |
| 2017/0013654 A1 | 1/2017 | Itagaki et al. |
| 2017/0231016 A1* | 8/2017 | Park .................... H04W 12/068 |
| 2017/0315711 A1* | 11/2017 | Adams ................ H04M 1/0241 |
| 2018/0150147 A1* | 5/2018 | Fujimaki ................. G06F 3/017 |
| 2018/0267488 A1 | 9/2018 | Lo |
| 2019/0065026 A1 | 2/2019 | Kiemele et al. |
| 2019/0208494 A1 | 7/2019 | Amachi et al. |
| 2019/0219826 A1 | 7/2019 | Taketani |
| 2019/0295372 A1 | 9/2019 | Petersen et al. |

* cited by examiner

ELECTRONIC DEVICE WITH INTUITIVE CONTROL INTERFACE

This application is a continuation of patent application Ser. No. 16/056,284, filed Aug. 6, 2018, which is hereby incorporated by reference herein in its entirety.

FIELD

This relates generally to electronic devices and, more particularly, to electronic devices that are used to communicate with other electronic devices.

BACKGROUND

A user's surrounding environment often includes multiple electronic devices. For example, a living room may include one or more desktop computers, laptops, keyboards, mice, headphones, cellular telephones, and other electronic devices. The electronic devices typically communicate with one another over wired connections or over wireless communications links such as Bluetooth® and WiFi® communications links.

Users may find it challenging to identify and control which devices are connected and how the devices are connected. Typically, a user must navigate to a settings menu on each individual device, which then provides a list of external devices to which that device is connected. This process can be cumbersome and unintuitive for the user. There may be multiple devices in the user's environment, making it challenging to manage connections between devices.

SUMMARY

An electronic device may include a display system and control circuitry. The display system may be a head-mounted display or may be a display that is not head-mounted. If desired, the content on the display system may be virtual reality content and/or augmented reality content.

The user's environment may be presented on the display system. The environment on the display may be a captured image of the environment, may be the actual real world viewed through an optical combiner, or may be a completely virtual image representing the environment.

The control circuitry may gather information about the external electronic devices in the environment, including determining a product type and location of each external electronic device and determining a status of wireless communications links between the external electronic devices. The external electronic devices may be presented on the display system according to their respective product types and locations in the environment. The display system may overlay computer-generated display elements onto the environment to indicate the status of wireless communications links between the external electronic devices.

The control circuitry may send control signals to the external electronic devices in response to touch input on the images and/or gesture input. The control signals may be used to establish or break wireless communications links between external electronic devices. A finger swipe from a first external electronic device to a second electronic device on the display or in the environment may cause the control circuitry to send wireless signals to at least one of the first and second external electronic devices to establish a wireless communications link between the first and second external electronic devices. A computer-generated display element may be overlaid onto the environment in response to the wireless communications link being established. The computer-generated display element may be a line extending between the first and second external electronic devices. A finger swipe across the computer-generated line on the touch-sensitive display may cause the control circuitry to send wireless control signals to at least one of the first and second external electronic devices to break the wireless communications link between the first and second external electronic devices.

The control circuitry may gather information about the external electronic devices using input-output circuitry. For example, the control circuitry may receive radio signals (e.g., ultra-wideband communications signals or other suitable radio signals) from an external device that are used to identify the type and/or location of that external device. The control circuitry may process depth information from one or more depth sensors to identify the type and/or location of an external device. The control circuitry may process camera images using image recognition techniques to identify a product type of each of external electronic device. The camera may capture images of a code on each external electronic device to identify that external electronic device. The code may be a bar code displayed on a display, a code emitted by an infrared light-emitting diode, a code emitted by a visible light-emitting diode, or a code formed from ultraviolet ink. Information about the external electronic devices may also be gathered by an antenna that receives radio signals from the external electronic devices and/or a speaker that receives audio signals from the external electronic devices.

DETAILED DESCRIPTION

A system may include one or more electronic devices. In some scenarios, an electronic device may be used to control external electronic devices. For example, an electronic device may be used to manage connections between external electronic devices and/or may serve as an input-output device for one or more external electronic devices. In other scenarios, an electronic device may send information to and/or receive information from one or more external electronic devices.

An electronic device may include input-output devices that provide an intuitive way for a user to control, gather information about, or otherwise communicate with external electronic devices. The input-output devices may include sensors for identifying external electronic devices within the user's environment, a display system for displaying information about the external electronic devices, and user input components such as touch sensors, force sensors, and other sensors for gathering touch input and/or gesture from a user's fingers. The electronic device may include communications circuitry for sending signals to and/or receiving signals from the external electronic devices based on the received user input.

For example, a camera may gather images of external electronic devices in the user's surrounding environment, control circuitry may identify and/or gather information about the external electronic devices, a display system may display the camera images in real time, and a user may control or communicate with the external devices by providing touch input to the display or providing other suitable user input. Computer-generated images (e.g., color-coded lines, virtual buttons, arrows, circles or other shapes, text, menus, colors, etc.) may be overlaid onto the real-time camera images on the display to facilitate user input operations.

In other arrangements, control circuitry may identify the types and locations of external electronic devices in the environment (e.g., both viewable and obstructed external electronic devices in the environment) using radio signals such as ultra-wideband communications signals, millimeter wave communications signals, or other suitable wireless communications signals. The external electronic devices may be presented on the display system according to their locations in the environment. The external electronic devices presented on the display system may be captured images of the external electronic devices, may be actual external electronic devices that are viewed through an optical combiner (e.g., a head-mounted display, a head-up display, etc.) or may be virtual, computer-generated images representing the external electronic devices.

Figure 1:
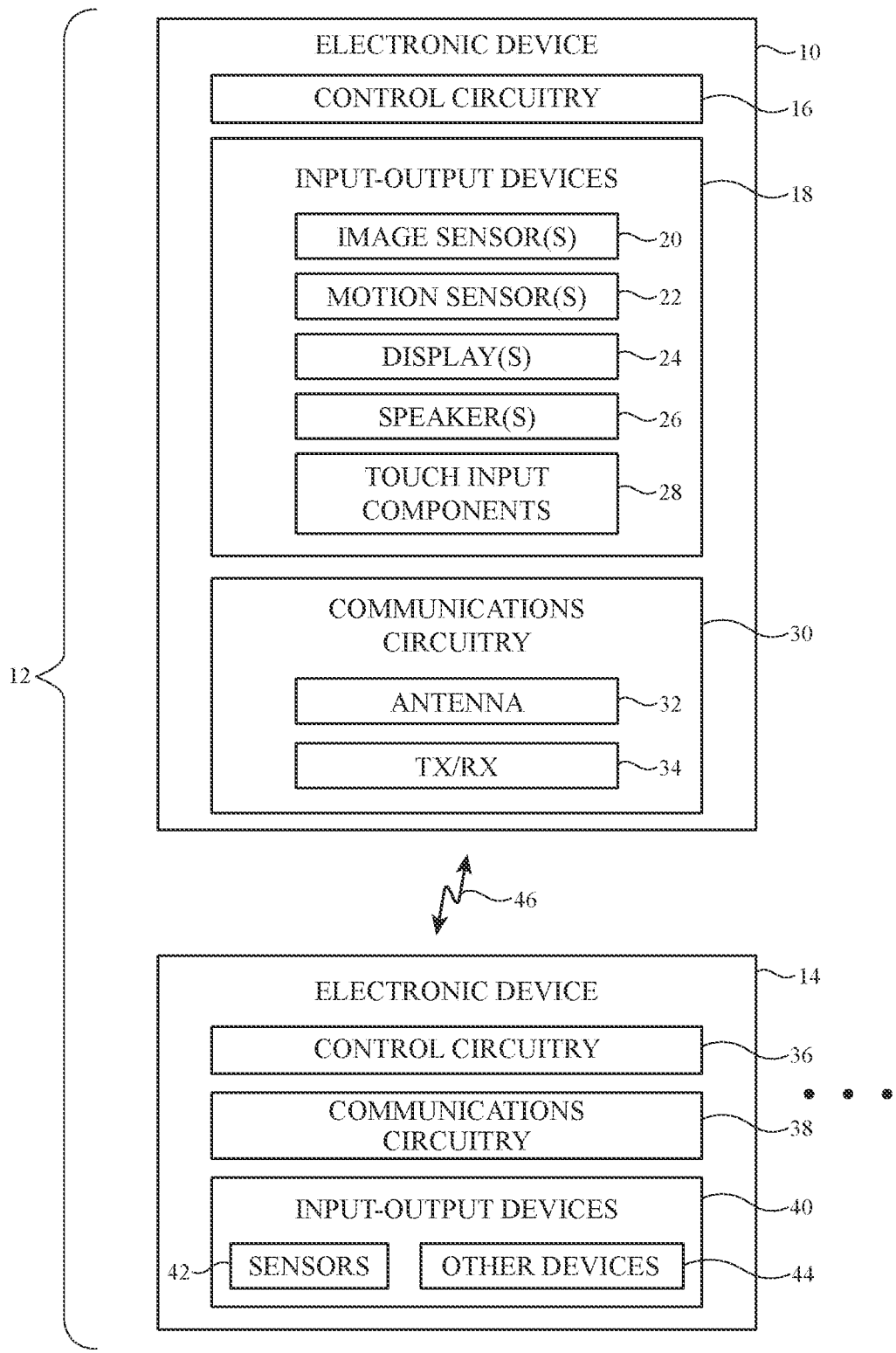
FIG. 1 is a schematic diagram of an illustrative system in which an electronic device with a display system communicates with external electronic devices in accordance with an embodiment.

An illustrative system for controlling or otherwise communicating with external electronic devices is shown in FIG. 1. As shown in FIG. 1, system 12 may include electronic device 10 and external electronic devices 14. Electronic devices in system 12 such as devices 10 and 14 may include devices such as a laptop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment.

Device 10 may include control circuitry 16. Control circuitry 16 may include storage and processing circuitry for supporting the operation of device 10 and/or system 12. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 16 may be used to control the operation of device 10. The processing circuitry may be based on one or more microprocessors, microcontrollers, digital signal processors, baseband processors, power management units, audio chips, application specific integrated circuits, etc.

To support interactions with external equipment, control circuitry 16 may be used in implementing communications protocols. Communications protocols that may be implemented using control circuitry 16 include internet protocols, wireless local area network protocols (e.g., IEEE 802.11 protocols—sometimes referred to as WiFi®), protocols for other short-range wireless communications links such as the Bluetooth® protocol, cellular telephone protocols, MIMO protocols, antenna diversity protocols, satellite navigation system protocols, millimeter wave communications protocols, IEEE 802.15.4 ultra-wideband communications protocols, etc.

Device 10 may include input-output devices 18. Input-output devices 18 may be used to allow data to be supplied to device 10 and to allow data to be provided from device 10 to external devices. Input-output devices 18 may include user interface devices, data port devices, and other input-output components. For example, input-output devices 18 may include one or more image sensors 20, motion sensors 22, display systems 24 (e.g., touch screens or displays without touch sensor capabilities), speakers 26, and touch input components 28.

Input-output devices 18 may also include buttons, joysticks, scrolling wheels, touch pads, key pads, keyboards, microphones, haptic elements such as vibrators and actuators, status indicators, light sources, audio jacks and other audio port components, digital data port devices, light sensors, capacitance sensors, proximity sensors (e.g., a capacitive proximity sensor and/or an infrared proximity sensor), magnetic sensors, and other sensors and input-output components.

Image sensors 20 (sometimes referred to as cameras 20) may include one or more visible digital image sensors (visible-light cameras) and/or one or more infrared digital image sensors (infrared-light cameras). Image sensors 20 may, if desired, be used to measure distances. For example, an infrared time-of-flight image sensor may be used to measure the time that it takes for an infrared light pulse to reflect back from objects in the vicinity of device 10, which may in turn be used to determine the distance to those objects. Visible imaging systems such as a front and/or rear facing camera in device 10 may also be used to determine the position of objects in the environment. For example, control circuitry 16 may use image sensors 20 to perform simultaneous localization and mapping (SLAM). SLAM refers to the process of using images to determine the position of objections in the environment while also constructing a representation of the imaged environment. Visual SLAM techniques include detecting and tracking certain features in images such as edges, textures, room corners, window corners, door corners, faces, sidewalk edges, street edges, building edges, tree trunks, and other prominent features. Control circuitry 16 may rely entirely upon image sensors 20 to perform simultaneous localization and mapping, or control circuitry 16 may synthesize image data with range data from one or more distance sensors (e.g., light-based proximity sensors), with motion data from motion sensors, and/or other data from other sensors. If desired, control circuitry 16 may use display system 24 to display a visual representation of the mapped environment.

Motion sensors 22 may include accelerometers, gyroscopes, magnetic sensors (e.g., compasses), and other sensor structures. Sensors 22 of FIG. 1 may, for example, include one or more microelectromechanical systems (MEMS) sensors (e.g., accelerometers, gyroscopes, microphones, force sensors, pressure sensors, capacitive sensors, or any other suitable type of sensor formed using microelectromechanical systems technology).

Motion sensors 22 may include circuitry for detecting movement and orientation of device 10. Motion sensors that may be used in sensors 22 include accelerometers (e.g., accelerometers that measure acceleration along one, two, or three axes), gyroscopes, compasses, pressure sensors, other suitable types of motion sensors, etc. Storage and processing circuitry 16 may be used to store and process motion sensor data. If desired, motion sensors, processing circuitry, and storage that form motion sensor circuitry may form part of a system-on-chip integrated circuit (as an example).

Display system 24 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures.

Display system 24 may include one or more liquid crystal displays, organic light-emitting diode displays, plasma displays, electrophoretic displays, microelectromechanical systems displays, electrowetting displays, displays with arrays of crystalline semiconductor light-emitting diode dies, and/or other types of displays.

In some arrangements, display system 24 be a head-mounted display (sometimes referred to as virtual reality glasses or augmented reality glasses). In arrangements where display system 24 is a head-mounted display, the components of device 10 may be contained entirely within the head-mounted device or some of the components may be head-mounted and some of the components may be located in a housing that is not head-mounted. For example, a handheld electronic device such as a cellular telephone or tablet computer may serve as an input-output device for a head-mounted display.

In other scenarios, display system 24 may be mounted in a cellular telephone, tablet computer, watch, or other support structure that is not attached to a user's head. Arrangements in which display system 24 is mounted in a housing that is not head-mounted are sometimes described herein as an illustrative example.

During operation, images may be displayed for a user on an array of pixels in display system 24. The images may include computer-generated images (e.g., images produced by control circuitry 16 of device 10 and/or other control circuitry in system 12), real-time images from a video camera such as camera 20, real-time images from camera 20 on which computer-generated images are overlaid, and/or other visual content. Images that are displayed as they are captured by camera 20 may sometimes be referred to as live camera images, live camera view images, live camera feed images, live video feed images, etc.

Display system 24 may be used to present computer-generated content such as virtual reality content and mixed reality content to a user. If desired, virtual reality content may be displayed in the absence of real-world content. Mixed reality content, which may sometimes be referred to as augmented reality content, may include computer-generated images that are overlaid on real-world images. The real-world images may be captured by a camera (e.g., a forward-facing camera) and merged with overlaid computer-generated content, or an optical coupling system may be used to allow computer-generated content to be overlaid on top of real-world images. As an example, a pair of mixed reality glasses or other augmented reality head-mounted display may include a display device that provides images to a user through a beam splitter, prism, holographic coupler, optical combiner, or other optical coupler.

Augmented reality content on display system 24 may also include computer-generated images that are overlaid onto the user's view of the real world itself, rather than being overlaid onto displayed images of the real world. With this type of arrangement, display system 24 may include transparent (see-through) optics such as an optical combiner that allows a user to view real world objects through display system 24. Display system 24 may present computer-generated images such that the user sees both the computer-generated images on display system 24 and also the real world through the display system. The computer-generated images enhance or augment the user's view of the real world.

Touch input components 28 may include force sensors and/or touch sensors. Touch input components 28 may include conductive capacitive touch sensor electrodes or other touch sensor components (e.g., resistive touch sensor components, acoustic touch sensor components, force-based touch sensor components, light-based touch sensor components, strain gauge components, etc.). Capacitive touch sensor electrodes may be formed from an array of indium tin oxide pads or other transparent conductive structures. Touch input components 28 may be configured to detect the location of touch input on device 10 and, if desired, to measure the amount of force associated with touch input on device 10. Touch input components 28 may include touch sensors and force sensors that work independently of one another (e.g., capacitive electrodes that detect touch and one or more strain gauges that detect force) and/or may include touch sensors that are integrated with force sensors (e.g., a single sensor may be used to detect touch and force).

Touch input components 28 may include mechanical buttons and/or non-mechanical buttons. Mechanical buttons may include a mechanical switch that is actuated by a button member when the button member is depressed by a user. Non-mechanical buttons may be formed from solid state semiconductor materials and/or may include touch sensors such as capacitive touch sensor electrodes. Non-mechanical buttons do not rely on mechanical switches and therefore can be operated without movement. This is, however, merely illustrative. If desired, non-mechanical buttons may be formed from touch sensors on a movable structure (e.g., a structure that moves relative to the housing of device 10 just as a mechanical button would move) and/or may be formed from touch sensors on a structure that appears to move without actually moving (e.g., by providing haptic output that mimics a button press).

Other sensors that may be included in input-output devices 18 include ambient light sensors for gathering information on ambient light levels, proximity sensor components (e.g., light-based proximity sensors, capacitive proximity sensors, and/or proximity sensors based on other structures), depth sensors (e.g., structured light depth sensors that emit beams of light in a grid, a random dot array, or other pattern, and that have image sensors that generate depth maps based on the resulting spots of light produced on target objects), sensors that gather three-dimensional depth information using a pair of stereoscopic image sensors, lidar (light detection and ranging) sensors, radar sensors, and other suitable sensors.

Control circuitry 16 may use communications circuitry 30 to transmit signals to and/or receive signals from external equipment such as external electronic devices 14. Communications circuitry 30 may include wireless communication circuitry such as one or more antennas such as antenna 32 and associated radio-frequency transceiver circuitry 34. Transceiver circuitry 34 may include wireless local area network transceiver circuitry (e.g., WiFi® circuitry), Bluetooth® circuitry, cellular telephone transceiver circuitry, ultra-wideband communications transceiver circuitry, millimeter wave transceiver circuitry, near-field communications circuitry, satellite navigation system circuitry such as Global Positioning System (GPS) receiver circuitry (e.g., for receiving GPS signals at 1575 MHz or for handling other satellite positioning data), and/or wireless circuitry that transmits and/or receives signals using light (e.g., with light-emitting diodes, lasers, or other light sources and corresponding light detectors such as photodetectors). Antennas 32 may include monopole antennas, dipole antennas, patch antennas, inverted-F antennas, loop antennas, slot antennas, other antennas, and/or antennas that include antenna resonating elements of more than one type (e.g., hybrid slot-inverted-F antennas, etc.). Antennas 32 may be formed from metal traces on printed circuits or other substrates, may include stamped metal parts, may include metal structures that form part of an enclosure or other supporting structure for device 10, may include wires and other conductive strands of material in fabric, and/or other conductive structures.

Device 10 may use communications circuitry 30 to communicate directly with external device 14, to communicate with a server, and/or to communicate with other devices in system 12.

Electronic device 14 of system 12 may include control circuitry 36. Control circuitry 36 may include storage and processing circuitry for supporting the operation of device 14 and/or system 12. The storage and processing circuitry may include storage such as nonvolatile memory (e.g., flash memory or other electrically-programmable-read-only memory configured to form a solid state drive), volatile memory (e.g., static or dynamic random-access-memory), etc. Processing circuitry in control circuitry 36 may be used to gather input from sensors and other input devices and may be used to control output devices. The processing circuitry may be based on one or more microprocessors, microcontrollers, digital signal processors, baseband processors and other wireless communications circuits, power management units, audio chips, application specific integrated circuits, etc.

Electronic device 14 may include input-output devices 40. Input-output devices 40 may be used in gathering user input, in gathering information on the environment surrounding device 14, and/or in providing a user with output. Devices 40 may include sensors 42. Sensors 42 may include force sensors (e.g., strain gauges, capacitive force sensors, resistive force sensors, etc.), audio sensors such as microphones, touch and/or proximity sensors such as capacitive sensors, optical sensors such as optical sensors that emit and detect light, ultrasonic sensors, and/or other touch sensors and/or proximity sensors, monochromatic and color ambient light sensors, image sensors, sensors for detecting position, orientation, and/or motion (e.g., accelerometers, magnetic sensors such as compass sensors, gyroscopes, and/or inertial measurement units that contain some or all of these sensors), muscle activity sensors (EMG), radio-frequency sensors, depth sensors (e.g., structured light sensors and/or depth sensors based on stereo imaging devices), optical sensors such as self-mixing sensors and light detection and ranging (lidar) sensors that gather time-of-flight measurements, humidity sensors, moisture sensors, and/or other sensors. In some arrangements, device 14 may use sensors 42 and/or other input-output devices 40 to gather user input (e.g., buttons may be used to gather button press input, touch sensors overlapping displays can be used for gathering user touch screen input, touch pads may be used in gathering touch input, microphones may be used for gathering audio input, accelerometers may be used in monitoring when a finger contacts an input surface and may therefore be used to gather finger press input, etc.).

If desired, input-output devices 40 of device 14 may include other devices 44 such as displays (e.g., to display images for a user), status indicator lights (e.g., a light-emitting diode that serves as a power indicator, and other light-based output devices), speakers and other audio output devices, electromagnets, permanent magnets, structures formed from magnetic material (e.g., iron bars or other ferromagnetic members that are attracted to magnets such as electromagnets and/or permanent magnets), batteries, etc. Device 14 may also include power transmitting and/or receiving circuits configured to transmit and/or receive wired and/or wireless power signals.

To support communications between devices 10 and 14 and/or to support communications between equipment in system 12 and other electronic equipment, control circuitry 36 may communicate using communications circuitry 38. Circuitry 38 may include antennas, radio-frequency transceiver circuitry, and other wireless communications circuitry and/or wired communications circuitry. Circuitry 38 may, for example, support bidirectional wireless communications between devices 10 and 14 over wireless link 46 (e.g., a Bluetooth® link, a WiFi® link, a 60 GHz link or other millimeter wave link, an ultra-wideband communications link, a near-field communications link, other suitable wired or wireless communications link, etc.). Device 14 may also include power circuits for transmitting and/or receiving wired and/or wireless power and may include batteries. In configurations in which wireless power transfer is supported between devices 10 and 14, in-band wireless communications may be supported using inductive power transfer coils (as an example).

Wireless signals 46 may be used to convey information such as location and orientation information. For example, control circuitry 16 in device 10 may determine the location of device 14 using wireless signals 46 and/or control circuitry 36 in device 14 may determine the location of device 10 using wireless signals 46.

Device 10 may track the location of device 14 using signal strength measurement schemes (e.g., measuring the signal strength of radio signals from device 10) or using time based measurement schemes such as time of flight measurement techniques, time difference of arrival measurement techniques, angle of arrival measurement techniques, triangulation methods, time-of-flight methods, using a crowdsourced location database, and other suitable measurement techniques. This type of location tracking may be achieved using ultra-wideband signals, Bluetooth® signals, WiFi® signals, millimeter wave signals, or other suitable signals. This is merely illustrative, however. If desired, control circuitry 16 of device 10 may determine the location of device 14 using Global Positioning System receiver circuitry, proximity sensors (e.g., infrared proximity sensors or other proximity sensors), cameras 20, depth sensors (e.g., structured light depth sensors that emit beams of light in a grid, a random dot array, or other pattern, and that have image sensors that generate depth maps based on the resulting spots of light produced on target objects), sensors that gather three-dimensional depth information using a pair of stereoscopic image sensors, lidar (light detection and ranging) sensors, radar sensors, using image data from a camera, using motion sensor data, and/or using other circuitry in device 10.

If desired, angle of arrival measurement techniques may be employed by control circuitry 16 of device 10 and/or control circuitry 36 of device 14 to determine the relative orientation of device 10 and device 14. For example, control circuitry 16 may determine the orientation of device 10 relative to device 14 by determining a phase difference associated with signals 46 received by antennas 32 in device 10. The phase difference may be used to determine an angle of arrival of signals 46 received by device 10. Similarly, control circuitry 36 of device 14 may determine the orientation of device 14 relative to device 10 by determining a phase difference associated with signals 46 received by antennas in device 14. The phase difference may be used to determine an angle of arrival of signals 46 received by device 14. Angle of arrival information may in turn be used to determine the direction in which a longitudinal axis of device 10 is being pointed relative to device 14.

Figure 2:
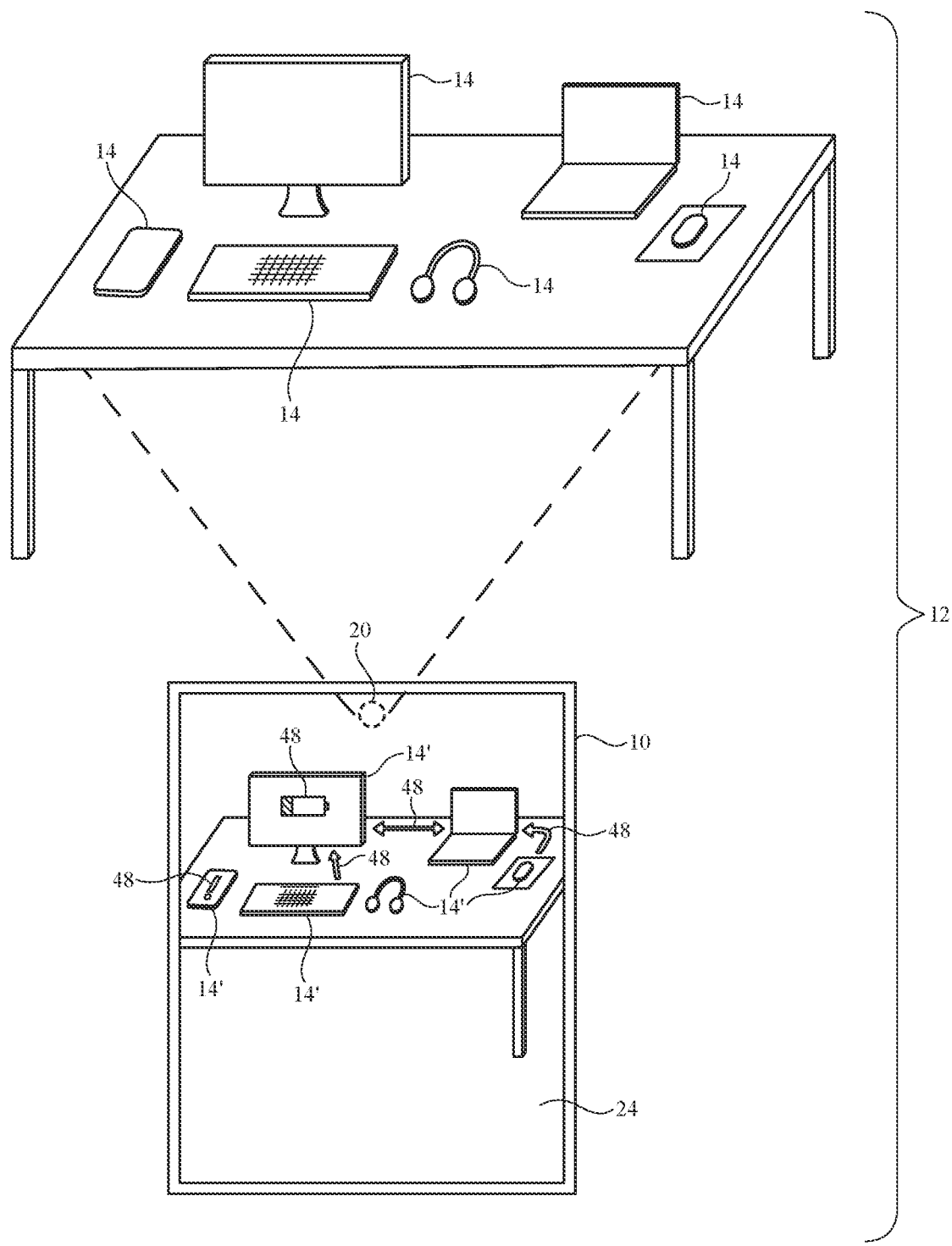
FIG. 2 is a perspective view of an illustrative system in which an electronic device presents an environment on a display system and a user provides touch or gesture input to interact with external electronic devices in the environment in accordance with an embodiment.

FIG. 2 is a perspective view of an illustrative system of the type shown in FIG. 1. System 12 may include electronic device 10 and external electronic devices 14. In the example of FIG. 2, external electronic devices 14 include a tablet computer, a computer monitor, a keyboard, a laptop, a mouse, and a pair of headphones. This is merely illustrative, however. In general, system 12 may include any suitable number and type of electronic devices.

A user of device 10 may wish to control, gather information from, or otherwise communicate with one or more of external electronic devices 14 in system 12. For example, a user of device 10 may wish to wirelessly pair first and second electronic devices 14 (e.g., to wirelessly pair a keyboard or mouse with a computer monitor or laptop, to wirelessly pair headphones with a tablet computer, to wirelessly stream or share audio, video, device screens, photos, or other data from one device 14 to another device 14, etc.). A user of device 10 may wish to easily obtain information about devices 14 (e.g., current operating state, battery life, data transfer rate, status of wireless or wired connections with other devices 14, or other information). A user of device 10 may wish to change a setting or operational state of one or more external devices 14 (e.g., to turn device 14 on or off, to adjust the brightness of a display or other light source in device 14, to adjust the volume of a speaker in device 14, etc.).

To provide an intuitive way for a user of electronic device 10 to control, gather information from, or otherwise communicate with external electronic devices 14, control circuitry 16 may identify and gather information about external electronic devices in the surrounding environment and may present computer-generated images on display system 24. The computer-generated images may be overlaid onto images of the real world (e.g., captured by camera 20 and displayed in real time on display system 24), may be overlaid onto the real world itself (e.g., the real world as viewed through display system 24 in arrangements where display system 24 includes an optical combiner), or may be overlaid onto an entirely virtual world (e.g., an entirely computer-generated image on display system 24).

As shown in FIG. 2, for example, a user of device 10 may operate device 10 in an environment. External electronic devices 14 may be located in the environment. Control circuitry 16 may present the environment on display system 24. The environment presented on display system 24 may be images of the environment captured by camera 20, may be the actual environment viewed through display system 24 (e.g., in arrangements where display system 24 has see-through optics such as an optical combiner that combines the real world scene with computer-generated image light), or may be a virtual environment that is constructed by control circuitry 16 based on information gathered about the environment.

The environment presented on display system 24 may include devices 14'. Devices 14' on display system 24 may be captured images of devices 14, may be actual real world devices 14 viewed through display system 24, or may be virtual representations of devices 14. The locations of devices 14' on display system 24 may correspond to the locations of devices 14 in the real world (e.g., if device A is located to the left of device B in the real world, device A may be presented on display system 24 to the left of device B). Devices 14' on display system 24 may include only devices 14 that are in the user's field of view, may include only devices 14 that are in the field of view of camera 20, and/or may include all devices 14 within a given environment, whether or not the devices 14 are viewable or obstructed from view.

A user of device 10 may control or communicate with external devices 14 by interacting with devices 14' on display system 24, by providing other suitable user input to device 10, and/or by providing input to another suitable input device.

To allow a user to intuitively control or communicate with external electronic devices 14, control circuitry 16 in device 10 may identify external electronic devices 14. This may include, for example, determining product type (e.g., laptop, computer monitor, keyboard, mouse, headphones, tablet computer, watch, etc.) and gathering other information about the product (e.g., settings, battery life, connection capabilities, network capabilities, current wired connections, current wireless connections, etc.).

Control circuitry 16 may identify and gather information from external electronic devices 14 using input-output devices 18 and/or communications circuitry 30. For example, control circuitry 16 may identify and gather information from external electronic devices 14 using data from camera 20 or other light sensor (e.g., by employing image recognition techniques to identify changes in contrast on device 14, colored or textured logos on device 14, corners or edges of device 14, product color, logo size relative to display or device size, etc., by reading a bar code on a display associated with device 14, by reading a bar code on a housing of device 14, by comparing a newly captured image of device 14 with a previously captured image of device 14, by reading a code associated with infrared pixels in a display associated with device 14, by determining pixel spacing and skew in a display associated with device 14, and/or by employing other light-based or image-based recognition techniques), using depth sensors (e.g., structured light depth sensors that emit beams of light in a grid, a random dot array, or other pattern, and that have image sensors that generate depth maps based on the resulting spots of light produced on target objects), using sensors that gather three-dimensional depth information using a pair of stereoscopic image sensors, using radar or lidar (light detection and ranging) sensors, using radio waves (e.g., Bluetooth® signals, WiFi® signals, 60 GHz signals or other millimeter wave signals, ultra-wideband communications signals, near-field communications signals, other suitable wireless communications signals) received by antenna 32 (e.g., by employing signal strength measurement techniques, phase difference measurement techniques, time of flight measurement techniques, time difference of arrival measurement techniques, angle of arrival measurement techniques, triangulation methods, etc.), using audio signals received by speaker 26 (e.g., by exchanging ultrasonic signals with device 14 that are at a frequency in or out of a human's audible range), using motion sensor data gathered by motion sensor 22 (e.g., using an accelerometer, gyroscope, magnetometer, and/or a Global Positioning System receiver to gather information on the location and movement of device 10 relative to devices 14, which may be used to supplement image data from camera 20, if desired), and/or using other data gathered by input-output devices 18 and/or communications circuitry 30. Some techniques, such as those that reply upon wireless communications signals, may be used to determine the locations and types of external electronic devices in the environment even if the external electronic devices are obstructed from view (e.g., a router behind a wall or other device not in direct line-of-sight of device 10).

Control circuitry 16 may process the data gathered by input-output devices 18 to identify a product type of each external electronic device 14, to determine the status of wireless communications links between external electronic devices 14 (e.g., to determine whether such wireless communications links are present and, if present, what types of wireless communications links are present), and/or to determine other information about external electronic devices 14.

After control circuitry 16 has identified and gathered the desired information from external devices 14, control circuitry 16 may assign input functions to respective input regions on display system 24. The input regions may be at any suitable location on display system 24. When a user provides touch input to an input region on display system 24, the input function associated with that input region may be executed by control circuitry 16. For example, each device 14' may serve as an input region on display system 24 with an associated input function. Control circuitry 16 may take appropriate action in response to receiving touch input on one of devices 14' (e.g., may display a menu of options on display system 24 for controlling or communicating with device 14, may turn the device 14 on or off, may adjust settings of device 14, may establish or break a wireless connection with device 14, and/or may take any other suitable action). Establishing a wireless communications link may include initiating a new wireless communications link between devices and/or activating an existing wireless communications link. Breaking a wireless communications link may include terminating or deactivating a wireless communications link between devices. This is, however, merely illustrative. If desired, any other suitable portion of display system 24 may serve as an input region having one or more designated input functions for controlling or communicating with devices 14. The input regions may be pinned to a particular location in a captured image (e.g., may be pinned to devices 14'), may be pinned to a particular location on display system 24, and/or may not be pinned to any particular location on the captured image or display system 24.

Arrangements in which touch input on display system 24 is used to interface with external devices 14 are merely illustrative. If desired, other types of input such as gesture input from a user's hands may be used to control, communicate with, or receive information about external devices 14.

Gesture input may be detected using one or more sensors in device 10 (e.g., infrared light cameras, visible light cameras, depth sensors such as structured light depth sensors, sensors that gather three-dimensional depth information using a pair of stereoscopic image sensors, lidar (light detection and ranging) sensors, radar sensors, etc.). If desired, gesture input may be gathered using sensors that are coupled to the user's hand, fingers, or wrist (e.g., using muscle sensors, motion sensors, optical sensors, or other suitable sensors in a watch, glove, or finger-mounted device to track movement of the user's hand and/or fingers).

Gestures that may be used to control, communicate with, or receive information about external devices 14 include swiping, waving, pinching, pointing, or any other suitable gesture. For example, if a user wishes to switch a pair of earphones to play audio from a laptop instead of a cellular telephone, the user may pinch his or her fingers near the earphones (e.g., to mimic grabbing a cord) and may drag his or her fingers to the laptop (e.g., to mimic plugging the cord into the laptop). Control circuitry 16 may be configured to detect this gesture input using sensors and may send corresponding control signals to the earphones, laptop, and/or cellular telephone to disconnect the earphones from the cellular telephone and wirelessly connect the earphones to the laptop. When the user is finished listening to audio from the laptop and wishes to switch back to playing audio from the cellular telephone, the user may chop, pinch, or provide other gesture input with his or her fingers near the laptop to mimic unplugging the cord from the laptop. In response to this gesture input, control circuitry 16 may send control signals to the earphones, cellular telephone, and/or laptop to disconnect the two devices (e.g., so that the audio stops playing from the laptop and, if desired, starts playing from the cellular phone again). This example is merely illustrative. In general, any suitable type of gesture input may be used to communicate with, control, or receive information about external devices 14.

In some scenarios, devices 14' may appear on display system 24 without any overlaid computer-generated content (e.g., display system 24 may present only the images captured by camera 20 or display system 24 may have see-through optics so that only real world objects are viewed on display system 24). In other scenarios, control circuitry 16 may overlay computer-generated images such as computer-generated display elements 48 onto display system 24 (e.g., onto the camera-captured images, onto the real world viewed through display system 24 in arrangements where display system 24 has see-through optics such as an optical combiner, or onto a virtual reality representation of the environment). Computer-generated display elements 48 may include lines, shapes, arrows, symbols, letters, numbers, characters, colors, on-screen menus, battery charge indicators, status indicators, virtual buttons, icons, sliders, or any other suitable element on display system 24. Computer-generated display elements 48 may be used to convey status information (e.g., battery level, operating temperature, download status information, data transfer rates, network information, volume, brightness, wireless pairing information, or any other suitable information), may be used to help inform the user of how to control or communicate with devices 14, may be used as input regions on display system 24 with corresponding input functions, may be used to inform the user when an action has been initiated or completed, may be used to inform the user of a type of connection between devices 14 (e.g., Bluetooth®, WiFi®, etc.), and or may be used to convey other information to a user of device 10.

In the example of FIG. 2, computer-generated display elements 48 include arrows indicating which devices 14 are wirelessly communicating with each other (e.g., which devices are connected over a wireless Bluetooth® or WiFi® communications link), battery status indicators indicating a current battery level of one of devices 14, and a symbol such as an exclamation point indicating a message, warning, or other information associated with one of devices 14.

Computer-generated display elements 48 may be pinned to a particular object in the environment. When a computer-generated display element 48 is pinned to an object in the environment, its location remains fixed relative to that object. For example, display elements 48 may include a battery status indicator pinned to monitor 14' on display system 24 to indicate a battery level of monitor 14. If a user moves device 10, monitor 14' and the associated display element 48 will move together across display system 24 as the position of device 10 changes. As device 10 is pointed towards or brought within the vicinity of new devices 14, those devices 14 will appear on display system 24 as devices 14', with new computer-generated display elements 48 specific to those devices 14.

In some arrangements, computer-generated display elements 48 may be used purely for providing output to a user of device 10. In other arrangements, computer-generated display elements 48 may be used for receiving input from a user of device 10. After control circuitry 16 identifies and gathers information from devices 14, control circuitry 16 may assign corresponding user input functions to computer-generated display elements 48 and may overlay the computer-generated display elements 48 onto display system 24 (e.g., onto live camera feed images being displayed on display system 24, onto the real world viewed through display system 24 in arrangements where display system 24 has see-through optics such as an optical combiner, or onto a virtual reality representation of the environment). The user may provide input to computer-generated display elements 48 and/or devices 14' on display system 24 by touching display system 24 (e.g., in arrangements where display system 24 is a touch-sensitive display) and/or by making gestures (e.g., using his or her hand to touch or otherwise interact with the user's environment and the computer-generated display elements 48 that are virtually overlaid onto the user's environment).

In response to touch input or gesture input to computer-generated display elements 48, control circuitry 16 may take appropriate action. Illustrative input functions that may be performed by control circuitry 16 in response to touch input or gesture input on computer-generated display elements 48, touch input or gesture input to devices 14' on display system 24, touch input or gesture input to other portions of display system 24, and/or any other suitable user input (e.g., motion input, audio input, touch or press input on other portions of device 10, etc.) include initiating or establishing a wireless communications link between devices 14, breaking a wireless communications link between devices 14, streaming or sharing content (e.g., audio, video, photos, a display screen, or other data) from one device (e.g., device 10 or 14) to another device (e.g., device 10 or 14), changing an output, operating state, or setting in devices 14 (e.g., turning device 14 on or off, adjusting brightness of a display or other light source in device 14, adjusting the volume of a speaker in device 14, adjusting media playback operations on device 14 such as pausing media, changing tracks, etc., and/or changing other settings or output from device 14), displaying a menu of options or other text on display system 24, and/or performing any other suitable function related to device 10 and/or devices 14.

The use of display system 24 in device 10 is merely illustrative. If desired, a user may control, communicate with, or receive information about external devices 14 without using display system 24. Device 10 may provide alternative output to the user (e.g., audio output, haptic output, other visual output not from display system 24, etc.) or may not provide any output to the user. For example, a user may provide touch input or gesture input to device 10 to control or communicate with external devices 14 and need not receive any output from device 10 in return.

In some arrangements, control circuitry 16 may take action with respect to external devices 14 without requiring user input. Input-output devices 18 may include sensors and control circuitry may take action automatically based on data gathered using the sensors. For example, eye-tracking sensors in a head-up display may be used to determine which external device 14 is within the user's gaze, and control circuitry 16 may take appropriate action depending on which device 14 is in the user's gaze. If the eye-tracking sensor determines that a user is looking at a computer monitor, control circuitry 16 may establish a wireless communications link between a keyboard and the computer monitor. If the eye-tracking sensor determines that the user's gaze moves to a tablet computer display, control circuitry 16 may establish a wireless communications link between the keyboard and the tablet computer. This allows the user to intuitively control which device receives the user's input to the keyboard. If desired, the eye-tracking sensor data may be used to determine which application on a display is being viewed (e.g., e-mail application, word processing application, messenger application, web browsing application, etc.), so that typing input or other user input is directed to the appropriate application.

FIGS. 3, 4, 5, 6, and 7 show illustrative ways in which a user may control, gather information about, or otherwise communicate with external electronic devices 14 using device 10.

Figure 3:
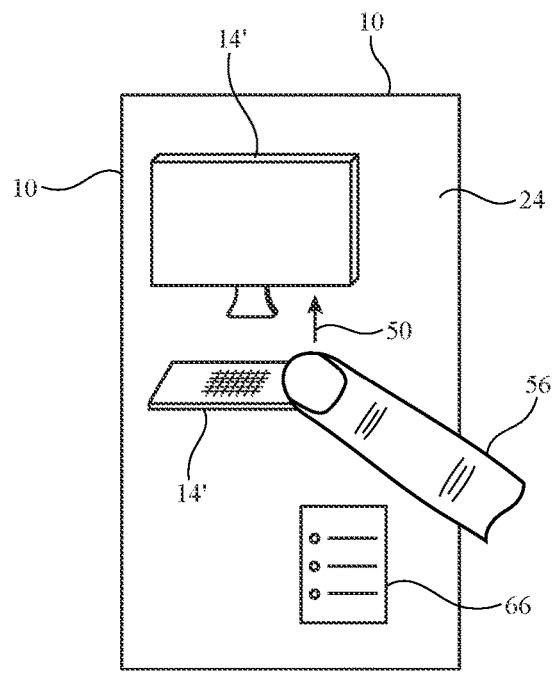
FIG. 3 is a front view of an illustrative electronic device showing how a finger swipe from a first external electronic device to a second external electronic device may be used to establish a wireless communications link between the first and second external electronic devices in accordance with an embodiment.

In the example of FIG. 3, control circuitry 16 of device 10 presents the user's environment on display system 24. The user's environment on display system 24 may be a live video feed of the user's environment (e.g., captured by camera 20), may be an actual view of the real world environment (e.g., viewed through display system 24 in arrangements where display system 24 has see-through optics such as an optical combiner), or may be a completely virtual representation of the user's environment (e.g., not based on actual camera images). External electronic devices 14 in the environment are presented on display system 24 as devices 14'. Devices 14' may, for example, include a wireless keyboard and a computer monitor. Control circuitry 16 of device 10 may identify which devices 14 are in the environment and may assign corresponding user input functions to portions of display system 24. A first user input region may be pinned to monitor 14', a second user input region may be pinned to keyboard 14', and additional user input regions may be located in other portions of display system 24.

If a user wishes to establish a wireless communications link between the keyboard and computer monitor, for example, the user may swipe his or her finger 56 in direction 50 on display system 24 from keyboard 14' to monitor 14'. If the user is providing gesture input instead of or in addition to touch input, the user may swipe his or her finger in the air (e.g., pointing towards keyboard 14' initially and moving his or her finger towards monitor 14'). Control circuitry 16 may process this touch input and/or gesture input and may send corresponding control signals to one or more of the external devices 14 (e.g., to the keyboard and/or to the computer monitor) to establish a wireless connection (e.g., a Bluetooth® link, a WiFi® link, a 60 GHz link or other millimeter wave link, an ultra-wideband communications link, a near-field communications link, other suitable wired or wireless communications link, etc.) between the external devices 14.

If desired, control circuitry 16 may display text on display system 24 in response to touch input to certain regions of an image or gesture input to certain regions of the environment. For example, if a user's finger 56 taps, presses, or otherwise provides touch input on keyboard 14', text 66 may appear on display system 24. Text 66 may provide information about keyboard 14 (e.g., battery life, status of connections, capabilities, settings, etc.) and/or may provide a user with options for controlling keyboard 14 (e.g., turning keyboard 14 on, establishing or breaking a wireless connection between the keyboard and the computer monitor, adjusting settings on keyboard 14, etc.). Similarly, if a user's finger 56 taps, presses, or otherwise provides touch input to monitor 14' text 66 may appear providing information about monitor 14 and/or providing options for controlling monitor 14. In general, text 66 may appear in response to any suitable touch input on display system 24 and may include information or options for interacting with any one of external devices 14 in the user's environment. The use of text is merely illustrative. If desired, images without text may be generated on display system 24 in response to touch input on devices 14' or other portions of display system 24.

Figure 4:
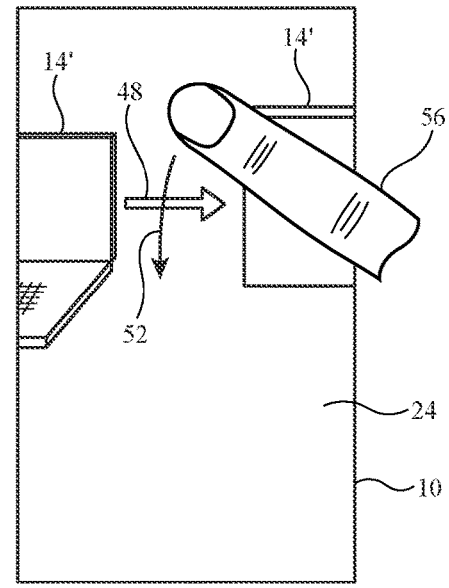
FIG. 4 is a front view of an illustrative electronic device showing how a finger swipe across a computer-generated line extending between first and second external electronic devices may be used to break a wireless communications link between the first and second external electronic devices in accordance with an embodiment.

FIG. 4 illustrates an example in which a user breaks a connection between external electronic devices 14. Control circuitry 16 of device 10 presents the user's environment on display system 24. The user's environment on display system 24 may be a live video feed of the user's environment (e.g., captured by camera 20), may be an actual view of the real world environment (e.g., viewed through display system 24 in arrangements where display system 24 has see-through optics such as an optical combiner), or may be a completely virtual representation of the user's environment (e.g., not based on actual camera images). External electronic devices 14 in the environment are presented on display system 24 as devices 14'.

Control circuitry 16 may identify the type of electronic devices 14 and may gather other information from electronic devices 14. Control circuitry 16 may, for example, receive wireless signals from one or more of devices 14 indicating that one device 14 is wirelessly paired with another device 14. For example, a laptop may be sharing its display screen or other data with a computer monitor. In response to determining that a wireless communications link exists between the laptop and computer monitor, control circuitry 16 may overlay computer-generated display element 48 (e.g., an arrow or other element) onto the environment on display system 24. Computer-generated display element 48 may indicate that content from one device 14 is being shared with or streamed to another device 14.

If a user wishes to break the wireless communications link between the laptop and the computer monitor, the user may provide touch input to display system 24 and/or may provide gesture input in the air. For example, a user may swipe his or her finger 56 in direction 52 on display system 24 or in the air across display element 48. Control circuitry 16 may process this touch input or gesture input and may send corresponding control signals to one or more of the external devices 14 (e.g., to the laptop and/or to the computer monitor) to break the wireless connection (e.g., a Bluetooth® link, a WiFi® link, a 60 GHz link or other millimeter wave link, an ultra-wideband communications link, a near-field communications link, other suitable wired or wireless communications link, etc.) between the external devices 14. This example is merely illustrative, however. If desired, other user input to device 10 (e.g., other suitable touch input, voice input, motion input, etc.) may be used to break a wireless communications link between external devices 14.

Figure 5:
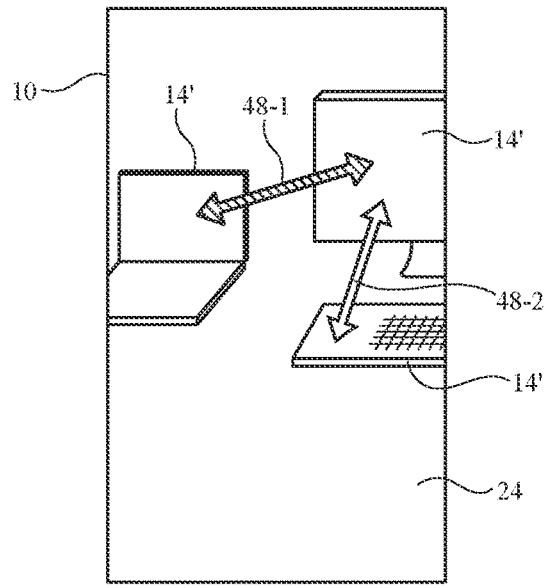
FIG. 5 is a front view of an illustrative electronic device showing how computer-generated display elements that are overlaid onto an environment may have different visual characteristics to indicate different types of wireless communications links in accordance with an embodiment.

FIG. 5 shows an example in which different types of computer-generated display elements 48 are used to convey different types of information to a user. For example, computer-generated display elements 48 overlaid onto display system 24 may include computer-generated display element 48-1 and computer-generated display element 48-2. Computer-generated display elements 48-1 and 48-2 may have different visual characteristics (e.g., may have different colors, shapes, sizes, patterns, etc.) to convey different types of information to a user of device 10.

Computer-generated display element 48-1 with a first visual characteristic may indicate a first type of wireless communications link (e.g., a Bluetooth® link, a WiFi® link, a 60 GHz link or other millimeter wave link, an ultra-wideband communications link, a near-field communications link, other suitable wired or wireless communications link, etc.) between external devices 14, and computer-generated display element 48-2 with a second visual characteristic different from the first visual characteristic may indicate a second type of wireless communications link different from the first type of wireless communications link. For example, a blue line between two devices 14' may indicate that the two devices 14 are wirelessly paired over a Bluetooth® communications link, whereas a red line between two devices 14' may indicate that the two devices 14 are wirelessly paired over a WiFi® communications link.

This is merely illustrative, however. In general, any suitable characteristic of computer-generated display elements 48 may be varied to convey any suitable type of information about external devices 14 and/or the types of options a user may have to interact with external devices 14.

Figure 6:
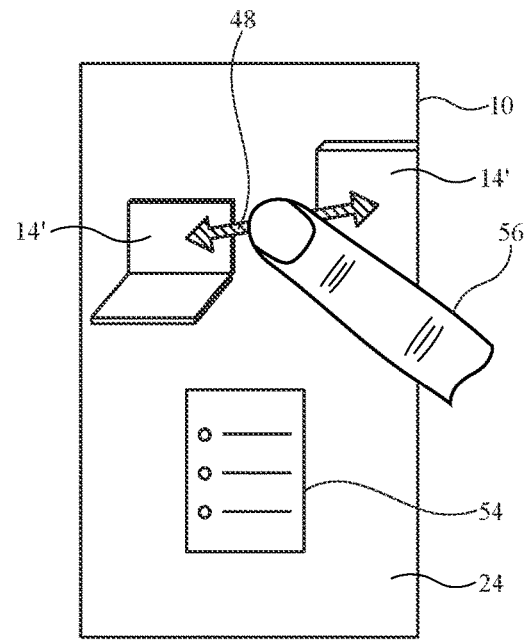
FIG. 6 is a front view of an illustrative electronic device showing how touch or gesture input on a computer-generated display element overlaid onto the environment may cause text to appear in the environment in accordance with an embodiment.

FIG. 6 shows an example in which user input on computer-generated display elements 48 causes text 54 to be displayed on display system 24. Text 54 may be a menu of options from which a user may select suitable actions to take with respect to external devices 14 (e.g., turning devices 14 on or off, establishing or breaking a wireless connection between external devices 14, adjusting settings on external devices 14, etc.) and/or may provide information on external devices 14 (e.g., battery life, status of connections, capabilities, settings, etc.).

Figure 7:
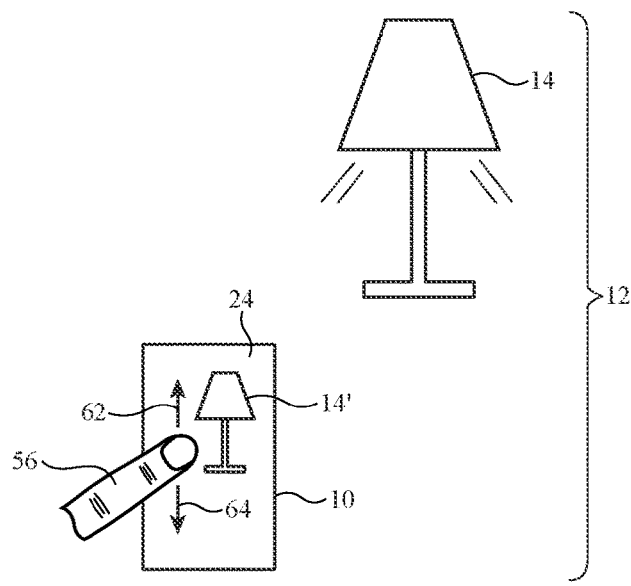
FIG. 7 is a diagram of an illustrative system showing how touch or gesture input may be used to control an external electronic device in the environment in accordance with an embodiment.

FIG. 7 shows an illustrative example in which a user controls external device 14 using device 10. Control circuitry 16 of device 10 presents the user's environment on display system 24. The user's environment on display system 24 may be a live video feed of the user's environment (e.g., captured by camera 20), may be an actual view of the real world environment (e.g., viewed through display system 24 in arrangements where display system 24 has see-through optics such as an optical combiner), or may be a completely virtual representation of the user's environment (e.g., not based on actual camera images). In the example of FIG. 7, external electronic device 14 in the user's environment is a lamp or other light source having an adjustable brightness. Control circuitry 16 may identify external device 14 and may assign corresponding user input functions to display system 24 based on the identified external device 14. For example, a user may swipe up in direction 62 on display system 24 to increase the brightness of light from external device 14 and may swipe down in direction 64 to decrease the brightness of light from external device 14.

In arrangements where multiple external electronic devices are in the user's environment (and presented on display system 24), different types of touch or gesture input may correspond to different types of control signals for the external electronic devices. For example, a swipe with one finger may control a single external electronic device 14 (e.g., may adjust the brightness of the light source towards which device 10 is pointed), a swipe with two fingers may control two external electronic devices 14 (e.g., may adjust the brightness of two light sources in the user's vicinity), and a swipe with three fingers may control all of the external electronic devices 14 in the user's vicinity (e.g., may adjust the brightness of all of the light sources in the same room). As another example, a single finger swipe from one device 14' to another device 14' may result in a first user input function (e.g., setting the two devices into dual screen mode), whereas a double finger swipe from one device 14' to another device 14' may result in a second user input function (e.g., setting the two devices into screen share mode).

Figure 8:
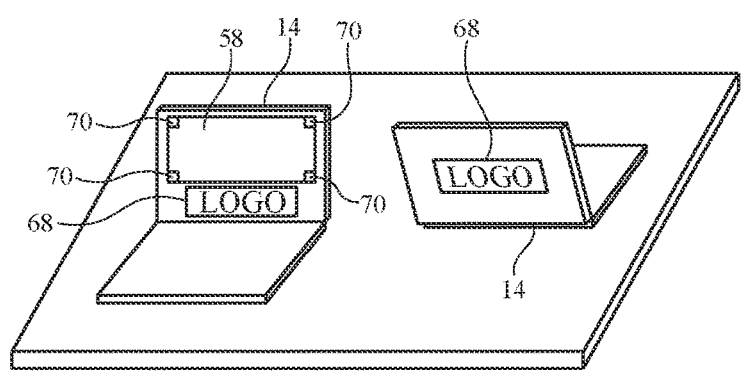
FIG. 8 is a perspective view of illustrative external electronic devices with features that may be picked up by a camera or other light sensor to identify the external electronic devices in accordance with an embodiment.
Figure 9:
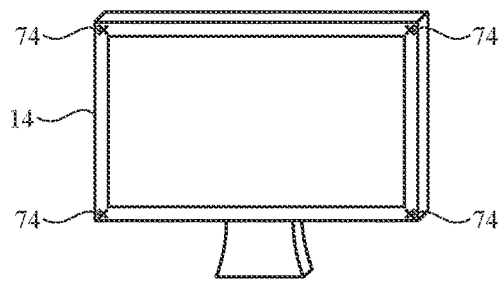
FIG. 9 is a perspective view of an illustrative external electronic device with visual markers that may be picked up by a camera or other light sensor to identify the external electronic device in accordance with an embodiment.
Figure 10:
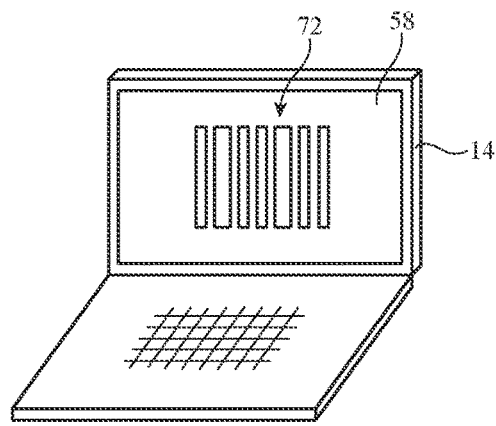
FIG. 10 is a perspective view of an illustrative external electronic device displaying a bar code that may be picked up by a camera or other light sensor to identify the external electronic device in accordance with an embodiment.

FIGS. 8, 9, and 10 show illustrative ways in which external electronic devices 14 may be identified by device 10.

As shown in FIG. 8, external electronic devices 14 may include one or more displays such as display 58 and one or more logos such as logos 68. Device 10 may use input-output devices 18 such as camera 20 or other light sensor to pick up visual features on external devices 14. Control circuitry 16 may process the captured images or other light sensor data to identify the type of device and/or gather other information about devices 14. For example, camera 20 may capture images of external devices 14, and control circuitry 16 may process the captured images and perform image recognition techniques to identify devices 14 (e.g., by identifying logo 68 on device 14, changes in contrast on device 14, colored or textured logos on device 14, corners or edges of device 14, product color, logo size relative to display or device size, etc.). A light source such as one or more infrared or visible light-emitting diodes on external electronic device 14 may flash on and off to transmit a binary recognition code that is captured by camera 20 or other light source in device 10 and read by control circuitry 16 to identify external electronic device 14. Pixels in display 58 of device 14 such as corner pixels 70 may be infrared pixels that emit light corresponding to a recognition code that is picked up by camera 20 and read by control circuitry 16. Control circuitry 16 may be configured to determine pixel spacing and skew in display 58 of device 14 based on images from camera 20, which may in turn be used to identify device 14. If desired, device 14 may upload an image of what is currently being displayed on display 58 (e.g., an identical image or a reduced-resolution image of what is being displayed on display 58) to a server and/or may send the image to device 10, and control circuitry 16 may analyze images from camera 20 to determine if a matching image is located in the captured images.

If desired, control circuitry 16 may determine if external devices 14 are facing towards device 10 or away from device 10. For example, logos 68 may appear differently on the back of device 14 than on the front of device 14, which may be detected by camera 20. Control circuitry 16 may take suitable action in response to determining that an external device 14 is faced away from device 10. This my include, for example, overlaying computer-generated display element 48 onto the device 14' on display system 24 to indicate that the device 14 is not available and/or to indicate that device 10 does not have access to that device 14. The computer-generated display element 48 may be a shade of grey overlapping a portion of the device 14' or may be any other suitable display element.

In the example of FIG. 9, visual markers such as visual markers 74 are located on external devices 14. Visual markers 74 may be ultraviolet ink, visible ink, infrared ink, physical marks, or other suitable visual markers that may be captured by camera 20 and read by control circuitry 16 to identify external devices 14.

In the example of FIG. 10, display 58 of external electronic device 14 displays a bar code 72 that is captured by camera 20 and read by control circuitry 16 to identify external electronic device 14. The use of a bar code is merely illustrative, however. If desired, display 58 may display other objects, patterns, etc., which may in turn be captured by camera 20 and read by control circuitry 16.

Figure 11:
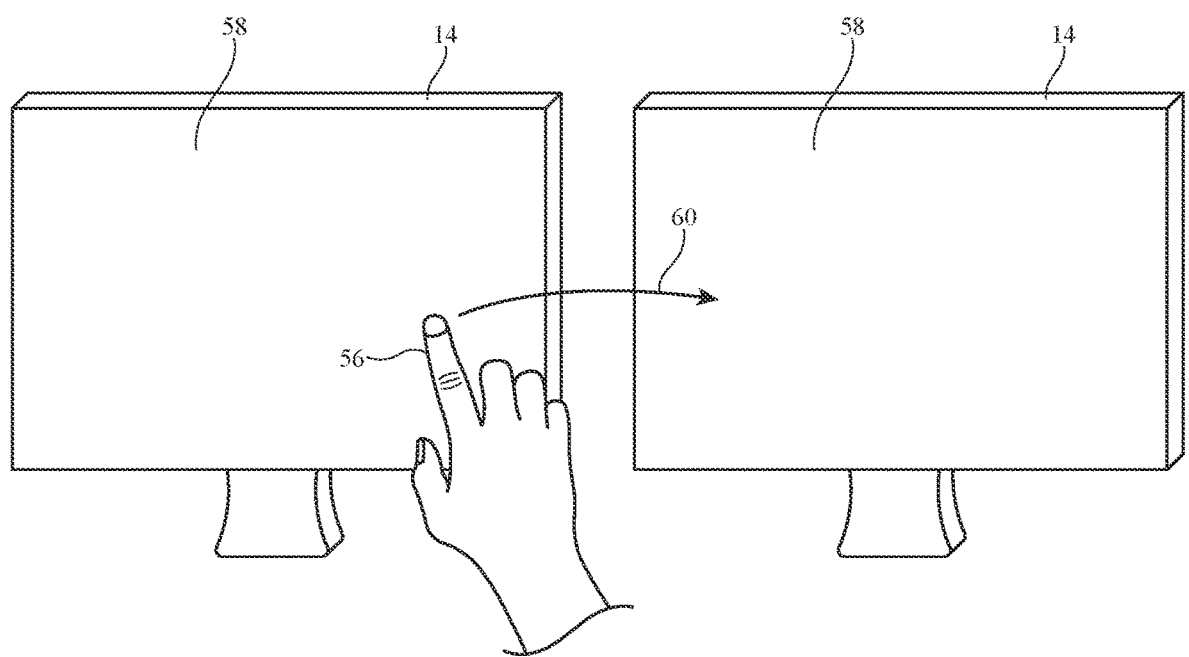
FIG. 11 is a perspective view of illustrative external electronic devices having a wireless communications link that is established in response to a finger swipe from one of the external electronic devices to the other in accordance with an embodiment.

FIG. 11 is a perspective view of an illustrative system in which a user interacts directly with a pair of external electronic devices to establish or break a wireless connection between the external electronic devices. Devices 14 may include touch screen displays 58. A user may, if desired, swipe from one display 58 to another display 58 in direction 60. Control circuitry 36 in each of the devices 14 may exchange wireless signals with the other device 14 using communications circuitry 38 so that the two devices 14 can compare the touch inputs to each display 58 (e.g., to determine the time difference between the touch inputs to each display 58). If the time difference and/or physical distance between the two devices 14 is within a predetermined range, control circuitry 36 in each device may establish a connection between the two devices 14 (e.g., a Bluetooth® link, a WiFi® link, a 60 GHz link or other millimeter wave link, an ultra-wideband communications link, a near-field communications link, other suitable wired or wireless communications link, etc.).

The use of touch input on touch screen displays 58 of external devices 14 is merely illustrative. If desired, the user may provide gesture input by moving his or her hand in the air in direction 60. The gesture input may be detected using sensors in device 10 and/or using sensors in one or both of external devices 14.

The foregoing is merely illustrative and various modifications can be made to the described embodiments. The foregoing embodiments may be implemented individually or in any combination.

What is claimed is:

1. A head-mounted device, comprising:
a head-mounted display configured to present images of a real-world environment that includes an external electronic device;
control circuitry configured to overlay computer-generated display elements onto the external electronic device in the images of the real-world environment, wherein the computer-generated display elements comprise an option for controlling an operational setting of the external electronic device; and
a sensor that gathers gesture input, wherein the control circuitry is configured to send wireless control signals for controlling the operational setting to the external electronic device in response to the gesture input.

2. The head-mounted device defined in claim 1 wherein the sensor comprises an infrared light camera.

3. The head-mounted device defined in claim 1 wherein the sensor comprises a visible light camera.

4. The head-mounted device defined in claim 1 wherein the operational setting is selected from the group consisting of: brightness level, volume level, power status, and media playback status.

5. The head-mounted device defined in claim 1 wherein the gesture input comprises gesture input to the computer-generated display elements.

6. The head-mounted device defined in claim 1 wherein the gesture input comprises hand gestures in the air.

7. The head-mounted device defined in claim 1 wherein the computer-generated display elements comprise information about the external electronic device.

8. The head-mounted device defined in claim 7 wherein the information is selected from the group consisting of: battery life, wireless connection status, and network capabilities.

9. A head-mounted device, comprising
a head-mounted display configured to present images of a real-world environment that includes an external electronic device;
a sensor that gathers gesture input; and
control circuitry configured to overlay computer-generated display elements onto the images of the real-world environment in response to the gesture input, wherein the computer-generated display elements comprise information associated with the external electronic device, and wherein the information is selected from the group consisting of: battery level, brightness level, volume level, power status, wireless connection status, and networking capabilities.

10. The head-mounted device defined in claim 9 wherein the sensor comprises a camera.

11. The head-mounted device defined in claim 9 wherein the sensor gathers additional gesture input and wherein the control circuitry is configured to send wireless control signals to the external electronic device in response to the additional gesture input.

12. The head-mounted device defined in claim 11 wherein wireless control signals comprise wireless control signals for adjusting an operational setting of the external electronic device.

* * * * *